United States Patent
Miller et al.

(10) Patent No.: US 7,347,473 B2
(45) Date of Patent: *Mar. 25, 2008

(54) VEHICLE TAILGATE HAVING SUPPLEMENTAL TAILGATE ASSEMBLY

(75) Inventors: Scott Miller, Canton, MI (US); Nelson Roos, Charlottesville, VA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/969,417

(22) Filed: Oct. 20, 2004

(65) Prior Publication Data

US 2005/0088848 A1  Apr. 28, 2005

Related U.S. Application Data

(60) Provisional application No. 60/515,066, filed on Oct. 28, 2003.

(51) Int. Cl.
    *B62D 33/03* (2006.01)
(52) U.S. Cl. .................. 296/26.1; 296/57.1; 296/62
(58) Field of Classification Search ............... 296/51, 296/57.1, 62, 26.08, 26.09, 26.1
    See application file for complete search history.

(56) References Cited

U.S. PATENT DOCUMENTS

| | | | |
|---|---|---|---|
| 4,624,619 A | 11/1986 | Uher | |
| 5,312,149 A | 5/1994 | Boone | |
| 5,468,038 A | 11/1995 | Sauri | |
| 5,478,130 A | 12/1995 | Matulin et al. | |
| 5,700,047 A | 12/1997 | Leitner et al. | |
| 5,788,311 A | 8/1998 | Tibbals | |
| 5,806,907 A | 9/1998 | Martinus et al. | |
| 5,902,000 A | 5/1999 | Wold | |
| 5,988,725 A | 11/1999 | Cole | |
| 6,019,410 A | 2/2000 | Trostle et al. | |
| 6,045,172 A | 4/2000 | Thomas et al. | |
| 6,120,076 A | 9/2000 | Adsit et al. | |
| 6,364,392 B1 | 4/2002 | Meinke | |
| 6,425,618 B1 | 7/2002 | Garland et al. | |
| 6,454,338 B1 | 9/2002 | Glickman et al. | |
| 6,626,478 B1 | 9/2003 | Minton | |
| 6,676,182 B2 | 1/2004 | Fitts | |
| 6,918,624 B2 * | 7/2005 | Miller et al. | 296/62 |
| 6,966,595 B2 * | 11/2005 | Bruford et al. | 296/57.1 |
| 6,988,756 B1 * | 1/2006 | Meinke et al. | 296/26.08 |
| 7,070,222 B2 * | 7/2006 | Bruford et al. | 296/57.1 |

FOREIGN PATENT DOCUMENTS

DE  2745751  4/1979

* cited by examiner

*Primary Examiner*—Jason S Morrow
(74) *Attorney, Agent, or Firm*—Gigette Bejin; Miller Law Group, PLLC

(57) ABSTRACT

A vehicle includes a supplemental tailgate assembly, which includes a tailgate extender that retracts within the tailgate and is extendable therefrom and right and left hand gate assemblies. The supplemental tailgate assembly is able to provide bed extender, box extender, step assist, roof rack, cargo storage area, and box divider functions. The supplemental tailgate assembly is stowable to minimize interference in cargo space when not in use.

24 Claims, 9 Drawing Sheets

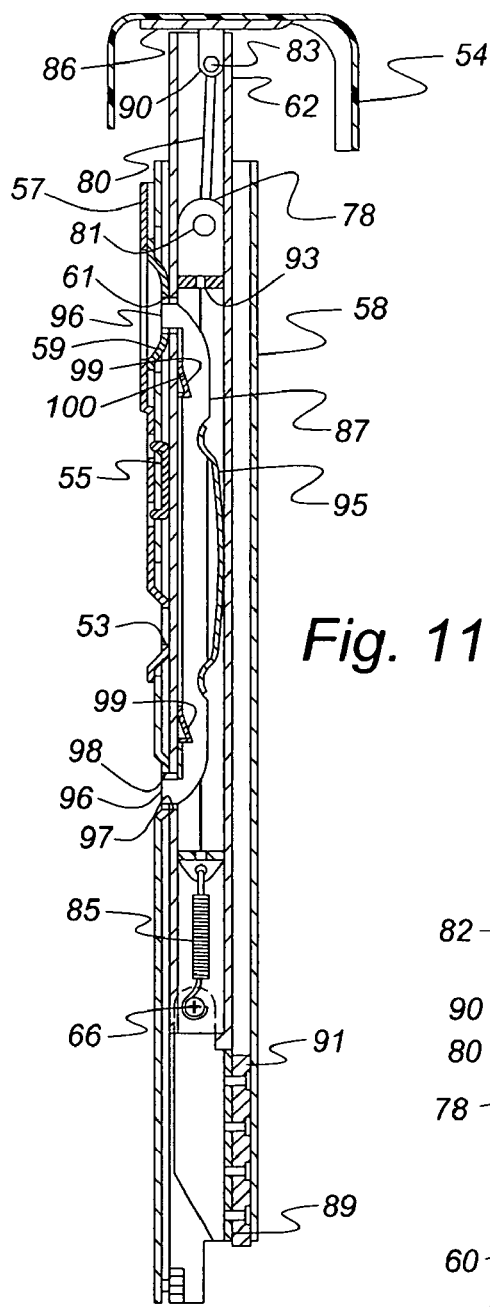
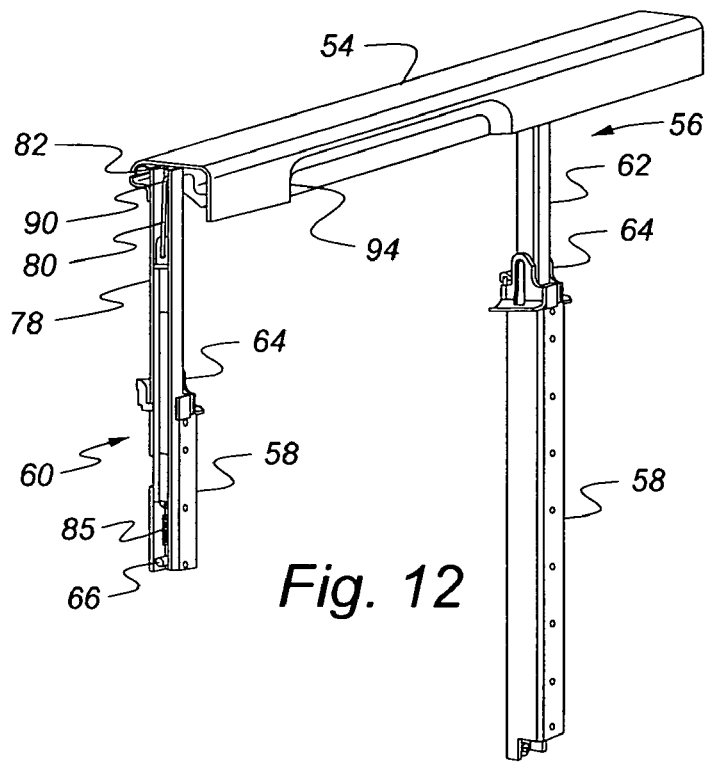

VEHICLE TAILGATE HAVING SUPPLEMENTAL TAILGATE ASSEMBLY

CROSS REFERENCE TO RELATED APPLICATIONS

This application claims the benefit of U.S. provisional patent application identified as application No. 60/515,066, filed Oct. 28, 2003, and is incorporated herein by reference.

BACKGROUND OF INVENTION

The present invention relates to vehicle tailgates, and more particularly to vehicle tailgates that include a multi-function assembly extendable therefrom.

Conventionally, pickup trucks include a tailgate at the back of a bed that closes off a cargo box. Often times, the truck bed is not long enough to hold the cargo, so truck bed extenders have been developed. The truck bed extenders work in conjunction with the tailgate in order to provide additional length to the bed. Some designs for pickup truck bed extenders have flush mounted extenders that are stowed in the tailgate when not in use. Being out of sight when not in use presents a more attractive vehicle, but these designs are generally lest robust than is desired for cargo support and also provide for only a limited number of types of extender functions.

With the versatility expected of pickup trucks today, there may be many types of extender functions desired. For example, a bed extender (a horizontally extending structure from an open tailgate), a box extender (an upwardly extending structure from an open tailgate that mimics the function of a closed tailgate), an assist step (a downwardly extending structure from an open tailgate that can be stepped-on for assistance in entering the bed), a roof rack type function (an upwardly extending structure from a closed tailgate that works in conjunction with the vehicle roof to support long loads), a bed divider type function (a divider that separates the bed into two main cargo holding areas), and a bed storage area type function, (a divider that creates a small enclosed area in the bed for cargo). Preferably, such functions can be provided with simple, ergonomic movements of the assembly, while still allowing for a generally attractive appearance and taking up minimal space in the vehicle box when not in use.

SUMMARY OF INVENTION

In its embodiments, the present invention contemplates a tailgate assembly for use with a motor vehicle having a first generally vertical side wall and a second generally vertical side wall, spaced from the first side wall, and a generally horizontal bed extending therebetween. The tailgate assembly includes a tailgate frame defining a generally hollow cavity therein and adapted to pivotally mount generally between the first and second side walls and being operable in a generally horizontal open position and a generally vertical closed position. The tailgate assembly also preferably includes a supplemental tailgate assembly including: a tailgate extender having a guide system secured generally within the hollow cavity; and a movable frame assembly having a telescoping support extendable from, pivotable relative to, and retained by the guide system, and a cross member connected to the telescoping support and extending generally normal thereto; and a first gate assembly including a first gate, adapted to pivotally couple to the first vertical side wall, and a second gate, pivotally coupled to the first gate, and with the first and second gates adapted to be pivotable to extend toward the movable frame assembly such that the second gate is adjacent to the movable frame assembly.

An advantage of an embodiment of the present invention is that the supplemental tailgate assembly is simple and ergonomic to operate, yet robust enough to restrain the cargo as desired.

Another advantage of an embodiment of the present invention is that a portion of the supplemental tailgate assembly can be easily removed, such that most of the extender functions are still available, but the remaining portion of the supplemental tailgate assembly is hidden and resembles the aesthetically pleasing look of a conventional pickup without a bed extender.

An additional advantage of an embodiment of the present invention is that the highly ergonomic and esthetically pleasing supplemental tailgate assembly still allows for a multi-function bed extender. This supplemental tailgate assembly can be moved to different positions in order to be employed to extend the bed, extend the box, divide the bed, create bed storage areas, provide a roof rack function, and also operate as an assist step.

BRIEF DESCRIPTION OF DRAWINGS

FIG. 11 is a cross section of the tailgate extender latching mechanism in accordance with the present invention.

FIG. 12 illustrates a rear perspective, partially sectioned view similar to FIG. 4, but with the section cut taken at a different location.

DETAILED DESCRIPTION

Figure 1:
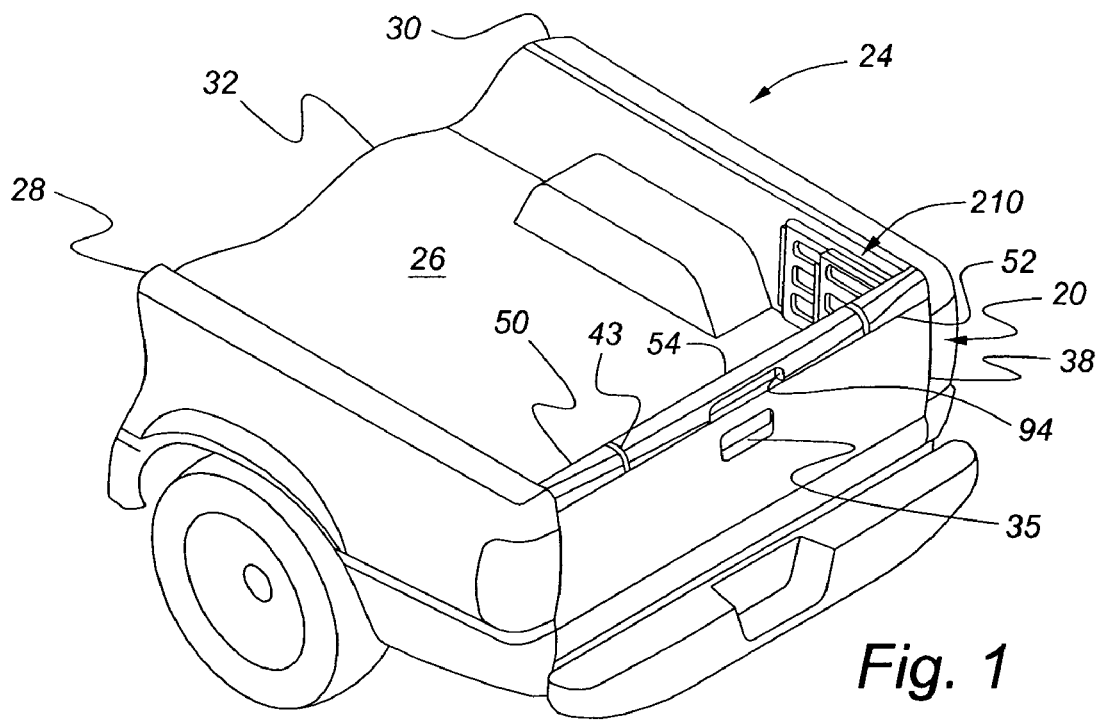
FIG. 1 is a perspective view of a rear portion of a vehicle having a tailgate and a gate assembly, with the tailgate shown in a generally vertical, closed position, and the gate assembly shown in a stowed position, in accordance with the present invention.
Figure 2:
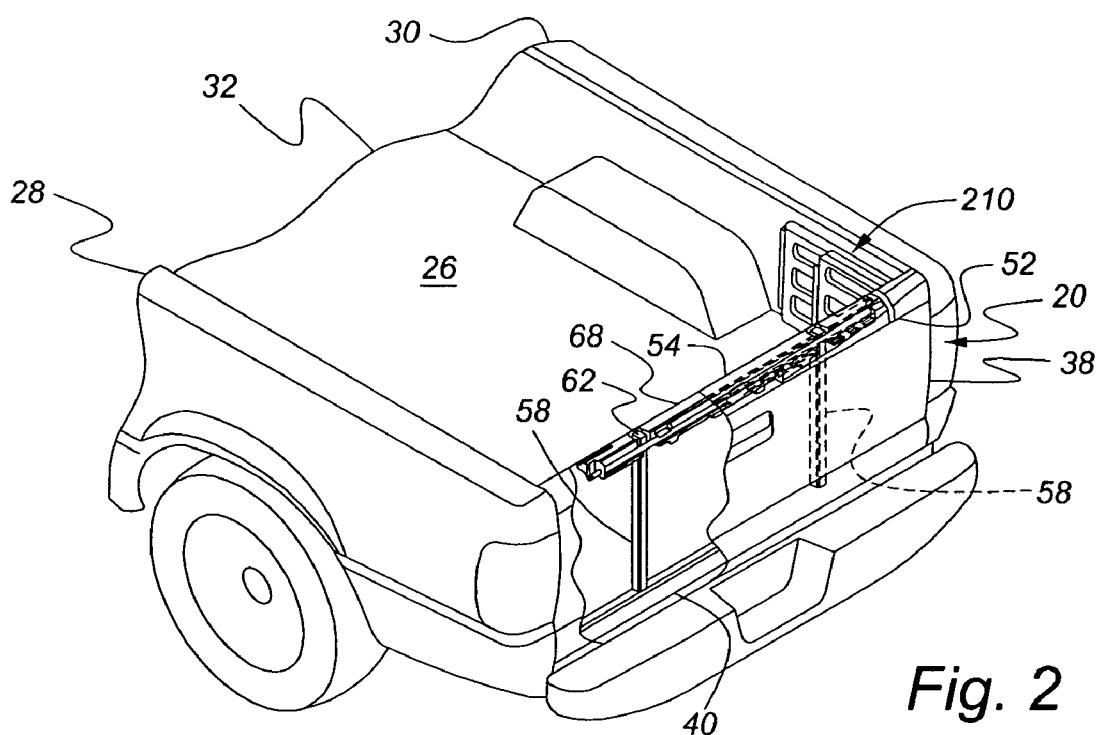
FIG. 2 is a partially cutaway perspective view similar to FIG. 1, with the cutaway area revealing the tailgate extender retracted into its stowed position within the vehicle tailgate.

FIGS. 1-12 illustrate a first embodiment of the present invention with a tailgate 20 that mounts to a vehicle 24—preferably a pickup truck. The tailgate 20 includes a tailgate extender 22, part of a supplemental tailgate assembly, mounted therein. The vehicle 24 includes a box 26 that is defined by a left rear quarter panel 28, which forms a first vertical surface of the box 26; a right rear quarter panel 30, which forms a second vertical surface of the box 26; a bed 32, which extends between the two panels 28, 30 to form a cargo floor; and the tailgate 20, which is pivotable between a generally vertical closed position and a generally horizontal open position.

The tailgate 20 includes a pair of conventional tailgate hinges 34 that preferably cooperate with the side panels 28, 30, and a pair of tailgate supports 36, which support the tailgate 20 when in its horizontal position. A tailgate handle 35 mounts to an outer panel 38, and functions in a conventional manner. The tailgate release mechanism and the handle 35, as well as tailgate latches, are conventional and well known in the art and so are not shown or discussed in any more detail herein. The tailgate 20 is comprised of a tailgate frame 37 including the outer panel 38, which forms the outer finished surface of the tailgate 20, and a tailgate frame inner panel 40, which mounts to the outer panel 38 and forms the inner surface and sides 42 of the tailgate 20. A tailgate reinforcement channel 48 may mount along the top of the tailgate outer panel 38 and inner panel 40. The outer panel 38, reinforcement channel 48, and inner panel 40 combine to form a pair of upper surfaces with a gap 43 therebetween. Other tailgate reinforcements (not shown) may be employed within the tailgate frame 37 in order to provide structural support to the frame outer and inner panels 38, 40. Also, the tailgate frame 37 includes a pair of structural stops 152 mounted thereon.

A left tailgate molding 50 and a right tailgate molding 52 mount on top of the upper surfaces. They may be made of colored plastic that is the desired color of the parts; this eliminates the need to paint them. In this way, the tailgate moldings 50, 52 will help to prevent paint scratches on metal parts when cargo is being loaded over the top of a closed tailgate 20.

The components that make up the tailgate frame 37 are formed so that a hollow internal cavity is created. Within this cavity, the tailgate extender 22 is retained. The tailgate extender 22 may include a pivotable molding 54, a movable frame portion 56, and guide rails 58. The guide rails 58 may be hollow, generally rectangular tubes that are fixed to the tailgate frame 37 and support the movable frame portion 56 as it is telescopically extended from and retracted into the guide rails 58.

Each guide rail 58 may include pivot brackets 64 mounted on top that cooperate with the movable frame portion 56 to allow for both pivoting of the movable frame portion 56 relative to the tailgate 20 and preventing the movable frame portion 56 from being separated from the guide rails 58. The pivot brackets 64 may be fastened to the reinforcement channel 48, and the bottoms of the guide rails 58 to the inner panel 40, in order to help secure the guide rails 58 to the tailgate 20. The pivot brackets 64 are located adjacent to the structural stops 152, thus allowing the structural stops 152 to set the angle of the tailgate extender 22 when in an assist step position.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or some other suitable means. Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position.

Each of the movable frame portion's support tubes 62 are hollow so they can receive a respective one of the two latching assemblies 60 therein. More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which are part of the pivotable molding 54, in order to form a release hinge 84.

Even though, for some features of the tailgate extender 22, only the feature on the left or right side is shown, the tailgate extender 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the support tubes 62 relative to the guide rails.

Each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the tailgate extender 22 is in its stowed position. Each latch housing 78 also includes internal flanges 99, located within the slot 93, that engage with release ramps 100 on the latch blade 87. The latching assemblies 60 disclosed herein is one example of means for releasably retaining the tailgate extender 22. Accordingly, other latching assemblies may be employed instead, if so desired.

Figure 8:
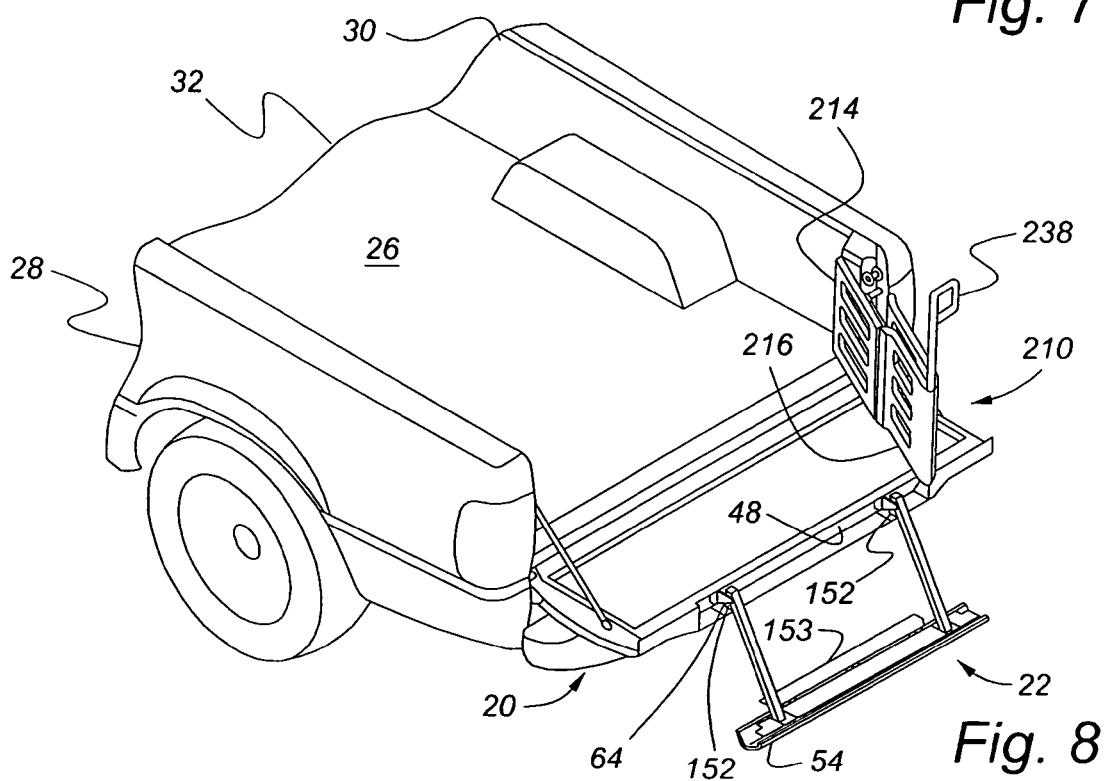
FIG. 8 is a partial, perspective view similar to FIG. 5, but with the tailgate extender shown in a fully extended, downwardly rotated position and the right hand portion of the gate assembly shown in a step assist position.

The movable frame portion 56 also includes a cross member assembly 68 that connects to the tops of the support tubes 62. The cross member assembly 68 includes cross members that form a support frame 70, as well as bracketry for pivot mounts 73 mounted on the support frame 70. The support frame 70 may be formed strong enough to support the weight of one or more people standing on it. Also, the cross member assembly 68 includes a flip step 153 pivotally mounted thereto. This way, when the movable frame portion 56 is extended out and pivoted downward toward the ground and against the stops 152, the flip step 153 can be pivoted away from the support frame 70, with the flip step 153 and support frame 70 usable as a step, (as best seen in FIG. 8).

Figure 9:
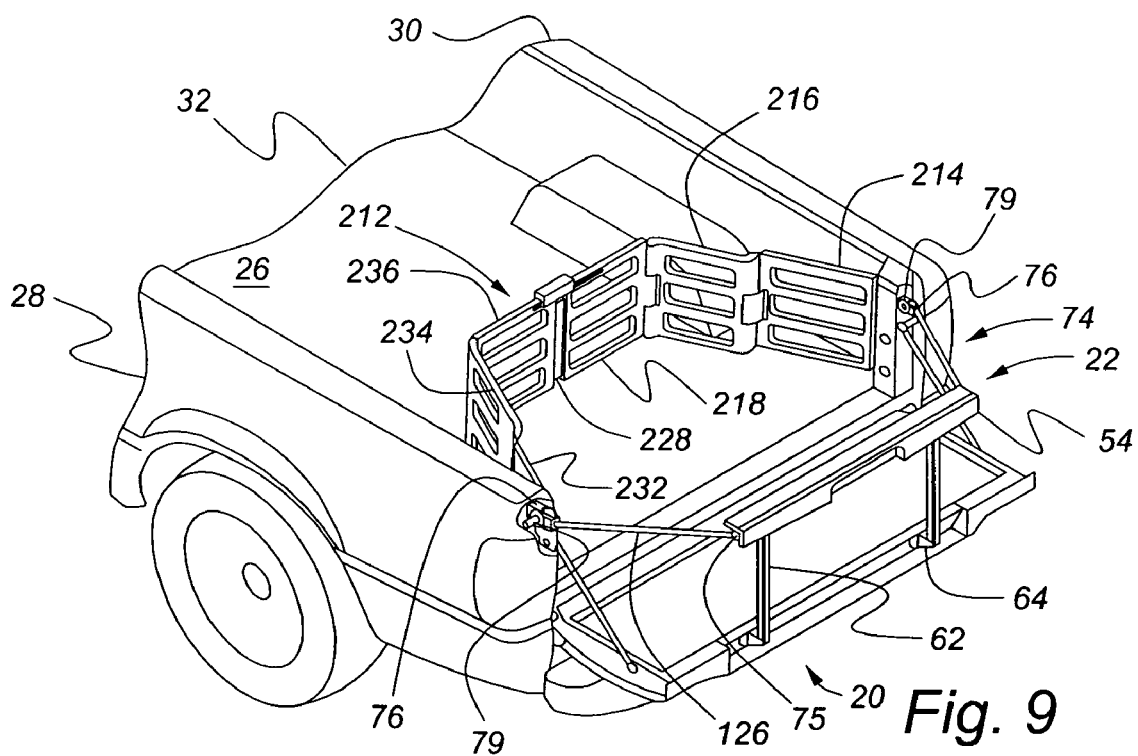
FIG. 9 is a partial, perspective view similar to FIG. 5, but with the tailgate extender shown in a fully extended, upwardly rotated position and the gate assembly shown in a box divider position.
Figure 10:
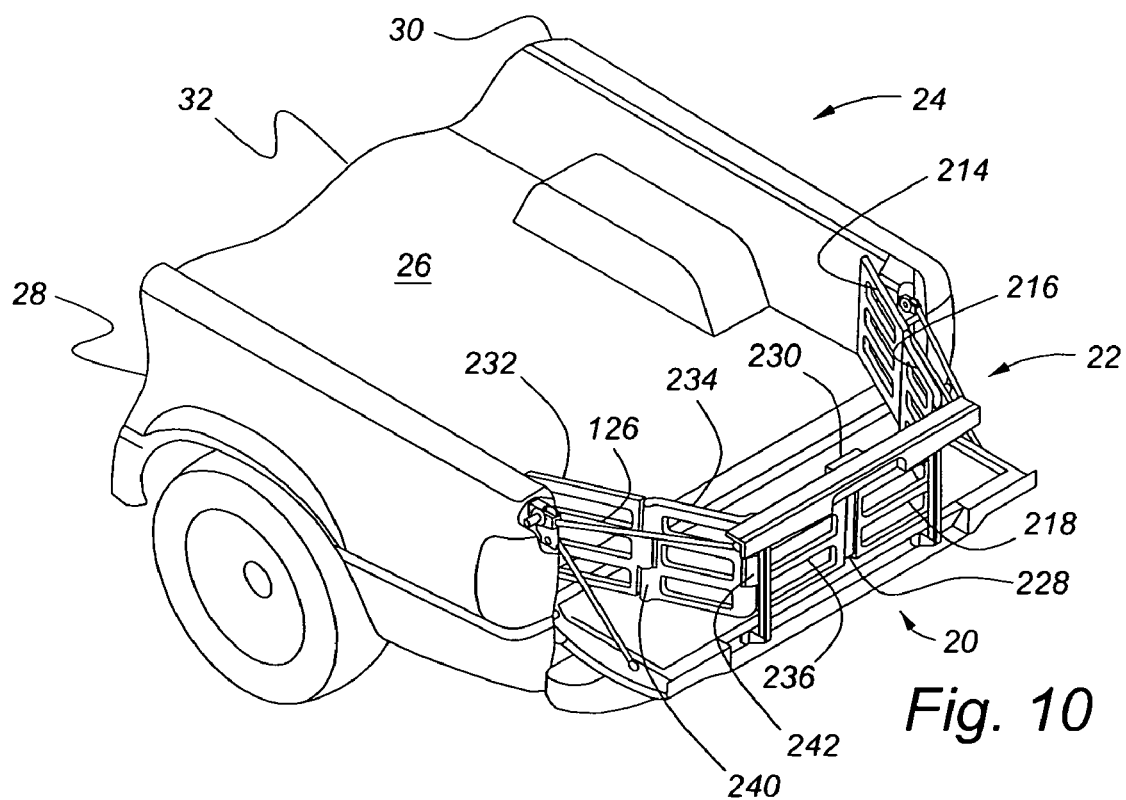
FIG. 10 is a partial, perspective view similar to FIG. 9, but with the gate assembly shown in a box extender position.
Figure 13:
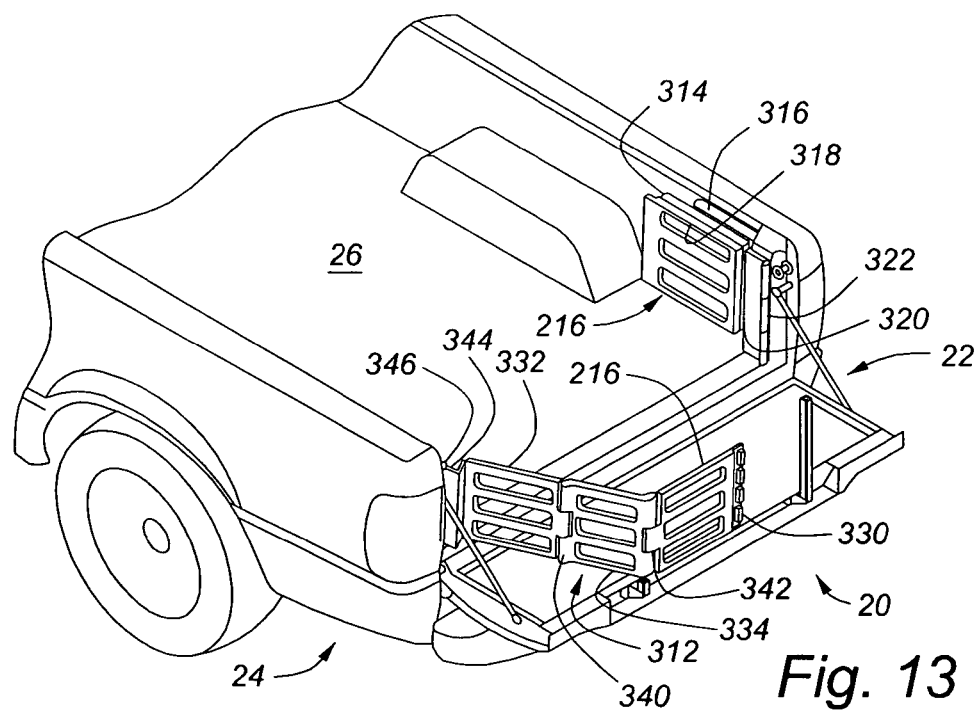
FIG. 13 is a schematic view of a vehicle having a tailgate, shown in an open, generally horizontal position, with a tailgate extender extending from the tailgate in an upwardly extending position, and with a left hand portion of a gate assembly shown in a box extending position and a right hand portion of the gate assembly shown in a stowed position, in accordance with a second embodiment of the present invention.
Figure 14:
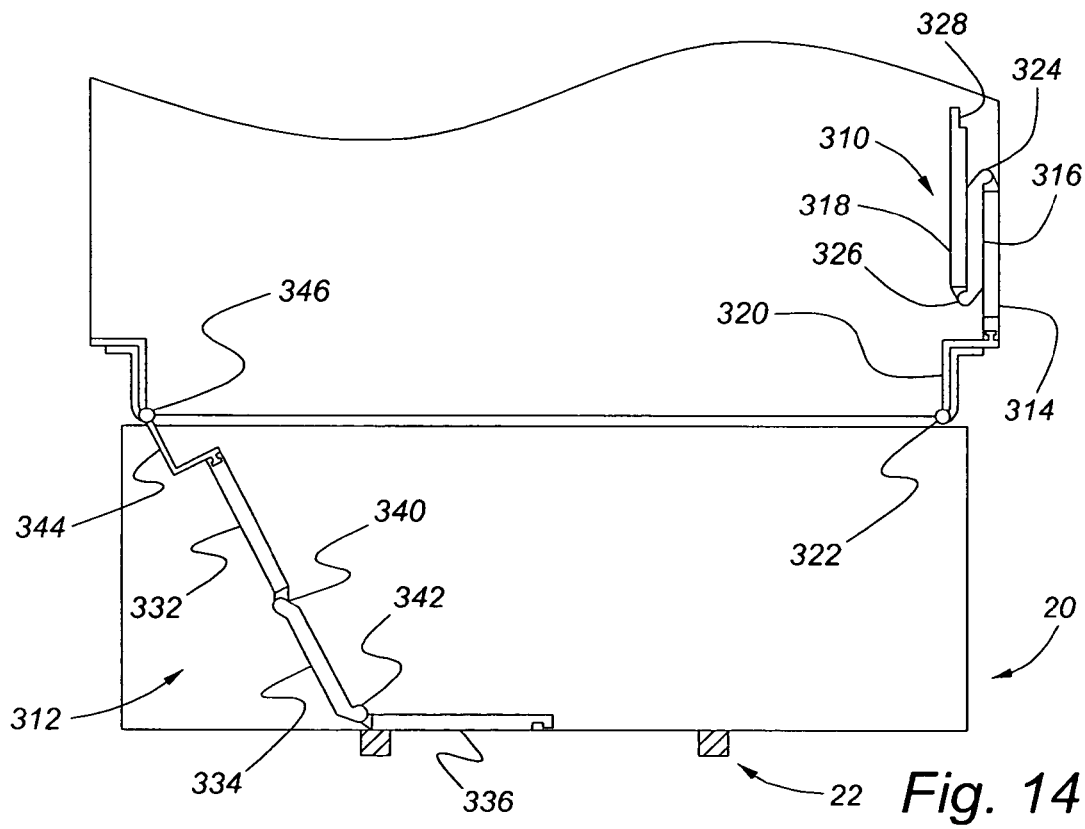
FIG. 14 is a schematic, plan view of the portion of the vehicle illustrated in FIG. 13.
Figure 15:
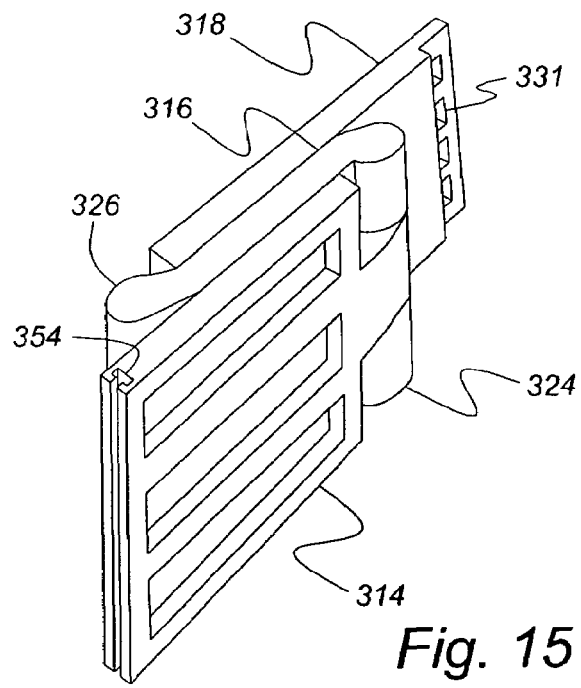
FIG. 15 is a perspective view of a right hand gate assembly in its stowed position, in accordance with the second embodiment of the present invention.
Figure 16:
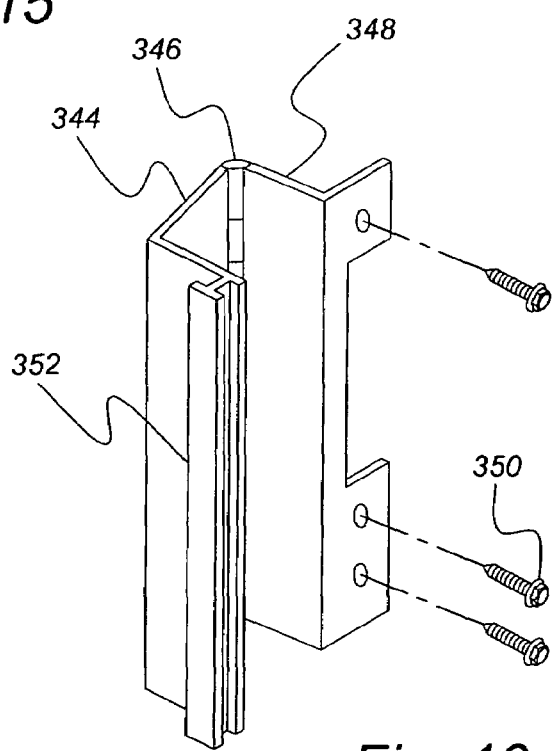
FIG. 16 is a perspective view of a hinge for a left hand gate assembly, in accordance with the second embodiment of the present invention.

The cross member assembly 68 may telescopically receive a pair of lock rod assemblies 74, with each having a pivot hinge 75 at one end of a rod 126 and a lock rod latch 76 at the far end. The pivot hinges 75 allow the lock rod assemblies 74 to be extended toward the truck so that the lock rod latches 76 can hook to supports 79 on the truck box 26 in order to allow the movable frame portion 56 to be held in its upright position, thus creating a box extender, (as best seen in FIGS. 9 and 10). The supports 79 may be just the conventional latch pins used to hold the tailgate 20 in its closed position, rather than separate supports mounted on the vehicle 24.

The pivot mounts 73 may connect to and mount the pivotable molding 54 about a pivot axis 77. The pivotable molding 54 may be formed from plastic, or other suitable material, such as, for example, a thirty percent glass filled polypropylene. The release levers 82 may be molded into the pivotable molding 54 while it is being formed or affixed thereto after forming by, for example, friction welding. Each release lever 82 includes a base 86 that is adjacent to the pivotable molding 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. The latching assemblies 60 unlatch, allowing the support tubes 62 to slide relative to the guide rails 58, when the latch actuation rods 80 are pulled upwards, and re-engage when the latch actuation rods 80 are released.

The pivotable molding 54 may be molded with the plastic being the desired final color so that it does not have to be painted. The pivotable molding 54 may also include a handle pocket 94 that is molded into the rear surface of the pivotable molding 54. The handle pocket 94 provides for ease of gripping and pivoting the pivotable molding 54 when deploying the tailgate extender 22. The pivotable molding 54 also may have an overall width that is just smaller than the gap 43 formed between the two tailgate moldings 50, 52, and has a top surface that is flush with the top surfaces of the two tailgate moldings 50, 52. Additionally, if so desired, the two tailgate moldings 50, 52 may include recessed flanges (not shown) that nest under the edges of the pivotable molding 54. Accordingly, the tailgate extender 22, when in its fully retracted position, will blend-in with the tailgate 20, having an appearance that is very similar to a tailgate that does not include a tailgate extender. Thus, the tailgate extender 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns. While the latching assemblies 60 are shown connected to and actuated by the pivotable molding 54, they may be connected to and actuated by a more conventional handle instead, if so desired.

The supplemental tailgate assembly, in addition to the tailgate extender 22, also includes a right hand gate assembly 210 and a left hand gate assembly 212. The right hand gate assembly 210 includes a first right hand gate 214, a second right hand gate 216 and a third right hand gate 218. The right hand gate assembly 210 also includes a right hand hinge plate 220, which is bolted to the right hand rear quarter panel 30 on the inside of the box 26, and a first right hand hinge 222, which pivotally couples the first right hand gate 214 to the right hand hinge plate 220. A second right hand hinge 224 pivotally couples the first right hand gate 214 to the second right hand gate 216, and a third right hand hinge 226 pivotally couples the second right hand gate 216 to the third right hand gate 218. The third right hand gate 218 also includes a right hand gate connector 228 extending from the main portion of the gate 218, and a slide latch 230 mounted on top of and slidable relative to the gate 218. A removable step assist handle 238 can mount to the tops of the second and third right hand gates above the third right hand hinge 226, (as seen in FIG. 8).

The left hand tailgate assembly 212 includes a first left hand gate 232, a second left hand gate 234, and a third left hand gate 236. The first left hand gate 232 connects to the left rear quarter panel 28 of the box 26 with a first left hand hinge, similar to the right hand side. A second left hand hinge 240 pivotally couples the first left hand gate 232 to the second left hand gate 234, and a third left hand hinge 242 pivotally couples the second left hand gate 23 to the third left hand gate 236.

The operation of the supplemental tailgate, including the tailgate extender 22 as well as the right and left hand 210, 212 gate assemblies, will now be described. The supplemental tailgate assembly is shown in its fully stowed position in FIGS. 1, 2 and 5. In this position, the tailgate extender 22 is stowed inside the tailgate 20, with only the pivotable molding 54 exposed, which blends in with the other tailgate moldings 50, 52. The right and left hand gate assemblies 210, 212 are each folded up against a side of the box 26, minimizing the potential for interference with cargo loaded in the box 26. From this position, either the tailgate extender 22, the right and left hand gate assemblies 210, 212, or both may be advantageously deployed in any number of cargo and assist positions.

Figure 5:
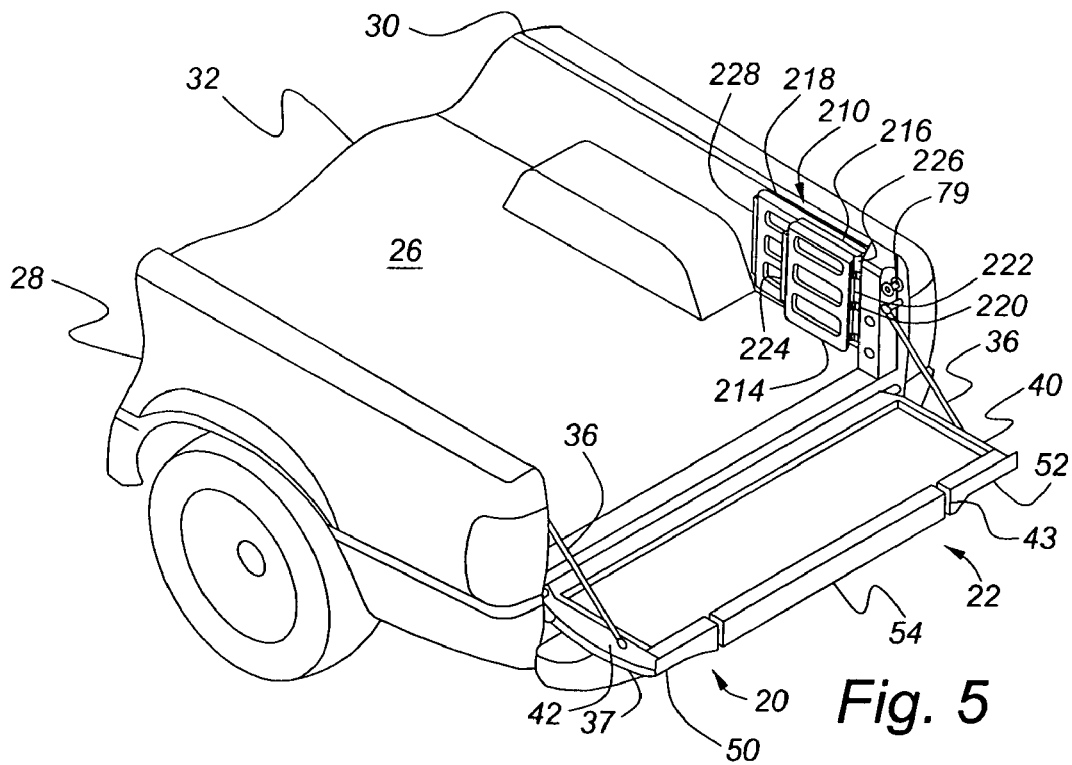
FIG. 5 is a partial, perspective view similar to FIG. 1, but with the tailgate shown in its open, generally horizontal position.

The tailgate extender 22 may be easily released from its stowed position within the tailgate 20 while the tailgate 20 is in its open or closed position. Although, for the most advantageous use of the tailgate extender functions, the tailgate 20 will be in its horizontal open position when released (as best seen in FIG. 5), with some type of gravity latch (not shown) that prevents release when the tailgate 20 is in its vertical position.

To deploy the tailgate extender 20 from its stowed position, one grasps the pivotable molding 54 and pivots it relative to the pivot axis 77. This will cause the release flanges 90 to pull up on the latch actuation rods 80, which, in turn, will pull up on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

Figure 7:
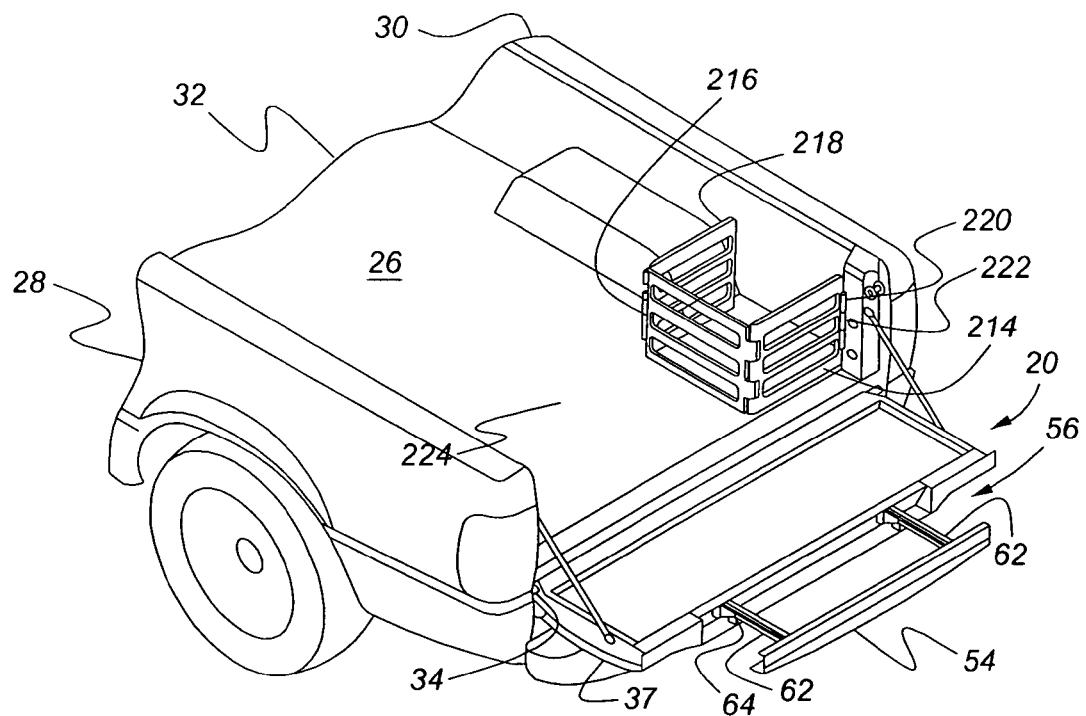
FIG. 7 is a partial, perspective view similar to FIG. 5, but with the tailgate extender shown in a partially extended position and the right hand portion of the gate assembly shown in a storage container position.

One then pulls on the tailgate extender 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20, the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58. Also, at these extended positions, the support tubes 62 still remain partially within the guide rails 58 so that the two will not pivot relative to one another. With the tailgate 20 in its horizontal open position, the tailgate extender 22 is now in its bed extender position, (as best seen in FIG. 7). While only a limited number of bed extender positions are discussed herein, the tailgate extender 22 may have additional bed extender positions by providing additional engagement slots, if so desired.

Figure 6:
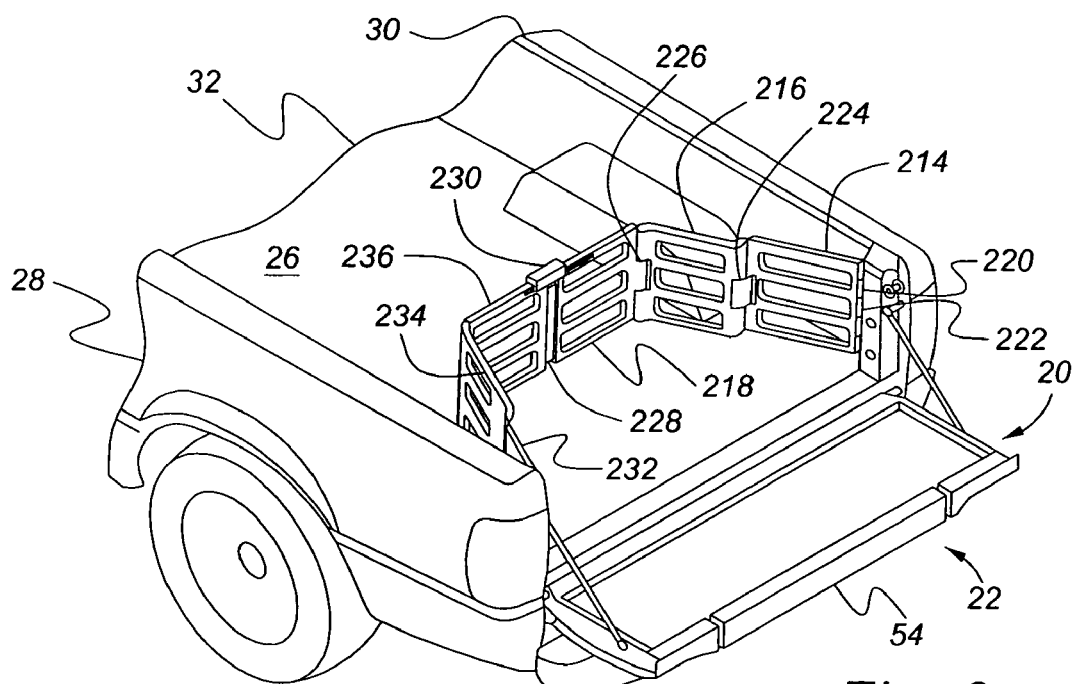
FIG. 6 is a partial, perspective view similar to FIG. 5, but with the gate assembly shown in a box divider position.

With the tailgate 20 in its open position, the right and/or left hand gate assemblies 210, 212 can be deployed in various positions to compliment the tailgate extender 22 function. For example, first right hand gate 214 may be pivoted to it extends out laterally into the box 26, with the second right hand gate 216 pivoted about normal to the first gate 214, and the third right hand gate 218 is pivoted about normal to the second gate 216 back toward the wall of the box 26, (as best seen in FIG. 7). In this way, when the tailgate 20 is open and the tailgate extender 22 is in its tailgate extension position, in order to allow the bed 32 to hold long cargo, the right hand gate assembly 210 can be used as a bed storage area for smaller cargo items. These smaller cargo items, then, will not fall out of the box 26 while the vehicle 24 is moving. In another example, the right and left hand gate assemblies 210, 212 may be pivoted forward and toward each other, with the slide latch 230 used to secure the third right hand tailgate 218 to the third left hand tailgate 236, (as best seen in FIG. 6). The supplemental tailgate assembly, then provides a box divider type of function with two large cargo areas in the box 26. This bed divider function may also be employed with the tailgate 20 open and the tailgate extender 22 extending out horizontally, (as the extender 22 is shown in FIG. 7). This effectively increases the length of the second cargo area in the box 26.

Figure 3:
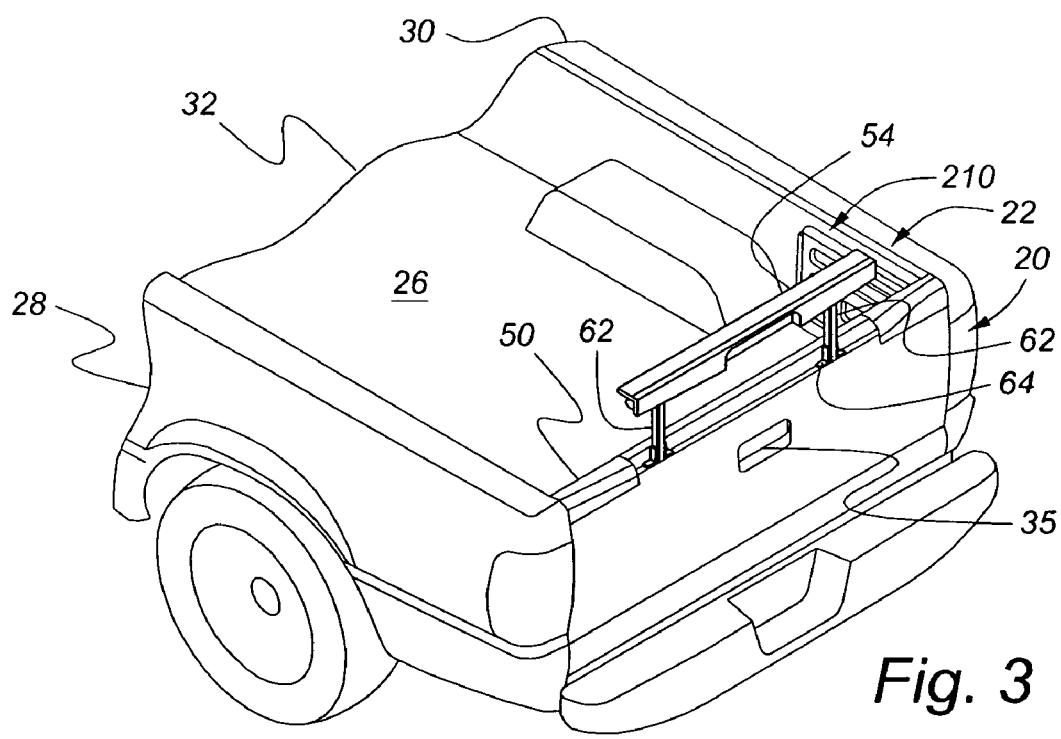
FIG. 3 is a partial, perspective view similar to FIG. 1, but with the tailgate extender shown in a partially extended position.
Figure 4:
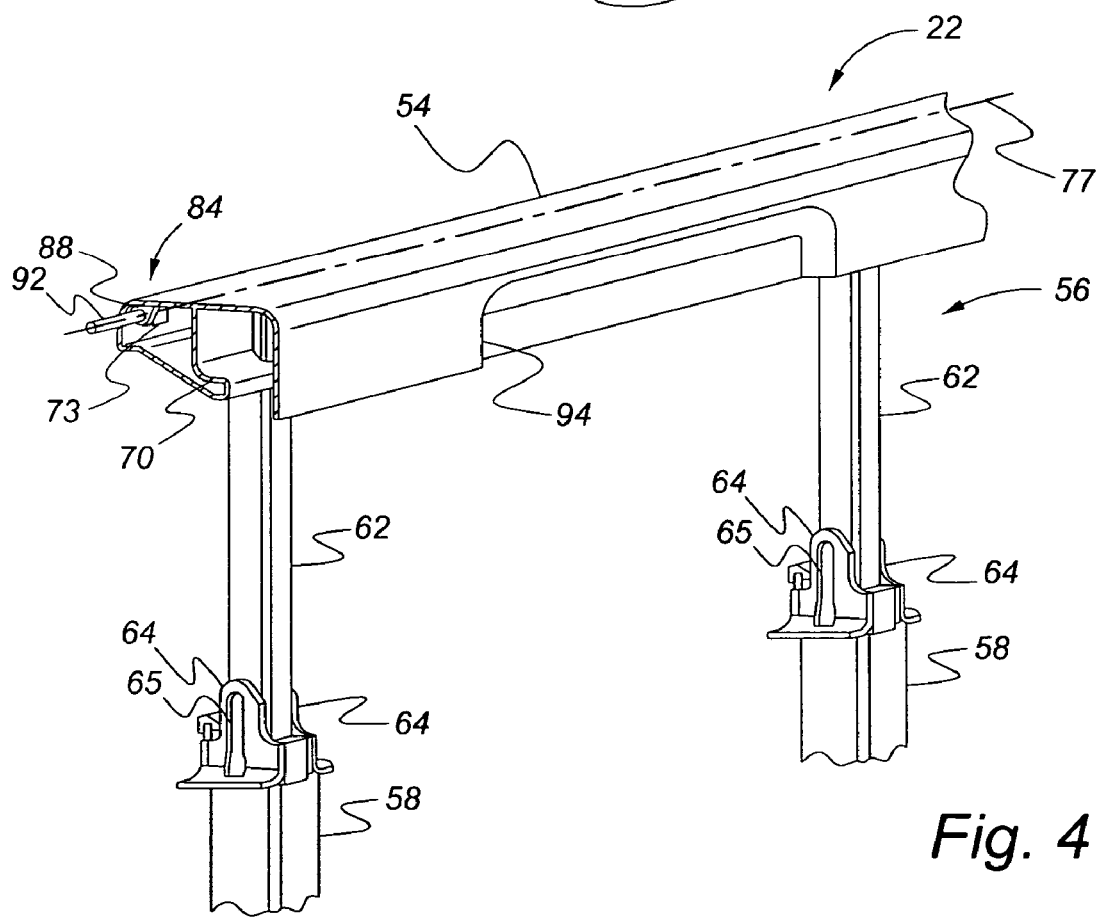
FIG. 4 is a perspective, partially sectioned view of the tailgate extender, but not illustrating lock rod assemblies and components, in accordance with the present invention.

Additionally, with the tailgate extender 22 still in the first extended position, the tailgate 20 may be closed, (as best seen in FIG. 3). The tailgate extender 22 can now be advantageously employed as a roof rack type of support. Very long items, such as ladders or canoes can be supported by both the vehicle cab roof (not shown) and by the top of the tailgate extender 22. The right and left hand gate assemblies 210, 212 of course may be employed in creating small cargo areas (as the right hand gate assembly 210 is shown in FIG. 7) or a box divider cargo areas (as the gate assemblies 210, 212 are shown in FIG. 6) without interfering with the roof rack type of function.

With the tailgate extender 22 in its first extended position, the pivotable molding 54 may then be pivoted again to release the latching assemblies 60 once more. One may then pull the tailgate extender 22 out to its fully extended position relative to the open tailgate 20. In this fully extended position, the support tubes 62 will be pulled out of the guide rails 58, with the hinge pins 66 engaged in the slots 65 of the pivot brackets 64. This will allow the tailgate extender 22 to be pivoted upward or downward, depending upon the particular functionality desired.

The movable frame portion 56, from its fully extended position, can be pivoted downward until the support tubes 62 engage the structural stops 152, with the tailgate extender 22 extending in a generally vertical orientation. In this position, the flip step 153 can be pivoted away from the support frame 70, with the flip step and the support frame 70 now acting as an assist step, (as best seen in FIG. 8). In this downward position, the pivotable molding 54 is on the underside of the movable frame portion 56, so it will not be stepped-on and damaged by the operator. Also, the support tubes 62 are preferably short enough that the pivotable molding 54 is spaced above the ground upon which the vehicle is standing. In this way, the molding 54 will not be scraped or damaged by contact with the ground, and the support frame 70, being higher off of the ground, will provide a better assist step function. In order to further assist one who is loading and unloading cargo, the right hand gate assembly 210 may be deployed into a step assist . position. The first right hand gate 214 is pivoted to extend aft in the general direction of the assist step, the second right hand gate 216 is pivoted to extend aft and generally parallel to the first 214, and the third right hand gate 218 is pivoted to be folded against the second gate 216. The optional step assist handle 238 can then be mounted on the second and third gates 216, 218 above the third right hand hinge 226, (as best seen in FIG. 8). Then, one stepping on the tailgate extender 22 in its step assist position can also grab the step assist handle 238 to steady himself.

The movable frame portion 56, from its fully extended position, can also be pivoted upward into an upward extending vertical position, to serve as a box extender. The lock rod assemblies 74 are deployed and latched onto the supports 79 on the box 26 in order to hold the movable frame portion 56 in the upright position. Again, the supports 79 may be the existing pin strikers that are normally used to hold the tailgate 20 in its closed position. The tailgate extender 22 can now hold cargo in the box 26 against aft directed loads on the cargo. The right and left hand gate assemblies 210, 212 can also be moved to their box divider position (as best seen in FIG. 9), thus creating two smaller box areas in the larger box 26. The forward box area is better suited to holding smaller cargo due to the large openings through the tailgate extender 22 in this position.

If one wishes, however, to be able to carry smaller cargo with an extended box area, then the right and left hand gate assemblies 210, 212 can be deployed to extend toward one another and rearwardly, (as best seen in FIG. 10). With the supplemental tailgate assembly deployed in this way, the gate assemblies 210, 212 will assure that smaller cargo is held within the box 26, while the tailgate extender 22 surrounds and supports the gate assemblies 210, 212. The lock rod assemblies 74 will support the right hand and left hand first and second gates 214, 216, 232, 234, while the support tubes 62 and cross member assembly 68 will support the right and left hand third gates 218, 236. Thus, the gate assemblies 210, 212 are supported at their hinge locations 224, 226, 240, 242 and all of the way to the top, which assures a robust support system for any cargo that with aft directed loads.

Performing any of these deployment operations generally in reverse will allow one to easily stow and latch the tailgate extender 22 back into the tailgate 20 and the right and left hand gate assemblies 210, 212 out of the way against the sides of the box 26. Hence, an easy to operate and ergonomic supplemental tailgate is provided for the vehicle 24.

FIGS. 13-16 illustrate a second embodiment of the present invention. In this embodiment, the right hand gate assembly 310 is now pivotally connected to a right hand hinge plate 320 and the left hand gate assembly 312 is pivotally connected to a left hand hinge plate 344 in order to provide more flexibility the positioning of the gate assemblies 310, 312.

The right hand hinge plate 320 is pivotally connected to a right hand support plate 349 via right hand hinge 322. The right hand support plate 349, in turn, is fastened to the box 26 in order to secure the right hand gate assembly 310 to the vehicle 24. The right hand hinge plate 320 includes a tongue 353 that slides within a groove 354 in a first right hand gate 314. The tongue and groove arrangement allows the right hand gates, when not needed in the vehicle 24, to be easily and quickly removed from the vehicle 24 by merely sliding the groove off of the tongue. The first right hand gate 314 is also pivotally connected to the second right hand gate 316 via a second right hand hinge 324. The second right hand gate 316, in turn, is pivotally connected to the third right hand gate 318 via a third right hand hinge 326. The third right hand gate 318 also includes a right hand gate connector 328 extending from its far end, with catch recesses 331 molded therein.

The left hinge plate 344 is pivotally connected to a left hand support plate 348 via a left hand hinge 346. The left hand support plate 348 is also fastened to the box 26 employing, for example, screws 350 or a releasable pin (as discussed relative to the third embodiment below). The left hand hinge plate 344 includes a tongue 352 that slides within a groove 355 in a first left hand gate 332. This second tongue and groove arrangement also allows for easy removal of the left hand gates when not needed in the vehicle 24. The first left hand gate 332 is also pivotally connected to the second left hand gate 334 via a second left hand hinge 340. The second left hand gate 334, in turn, is pivotally connected to the third left hand gate 336 via a third left hand hinge 342. The third left hand gate 336 also includes a left hand gate connector 329 extending from its far end, with connector protrusions 330 extending therefrom. The connector protrusions 330 are sized and spaced to fit within the catch recesses 331 in order to secure the third right hand gate 318 to the third left hand gate 336 when desired to do so.

The right and left hand gate assemblies 310, 312 and tailgate extender 22 of the supplemental tailgate can be employed, along with the tailgate 20, to perform the functions discussed above with regard to the first embodiment. The deployment and stowage processes are essentially the same, but with the added flexibility of the hinge plates 320, 244, and a more simple and quick way to completely remove the gates from the box 26 when so desired.

Figure 17:
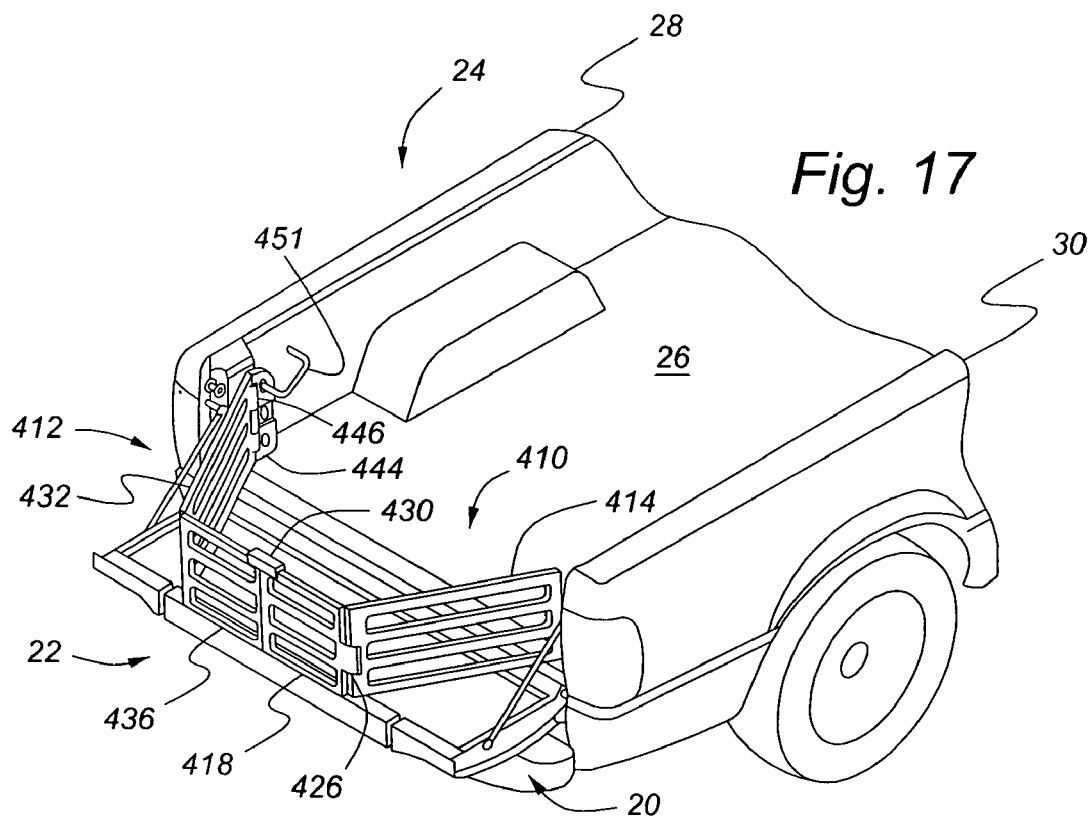
FIG. 17 is a partial, perspective view of a vehicle with a tailgate in an open, generally horizontal position, and a gate assembly in a box extender position, according to a third embodiment of the present invention.
Figure 18:
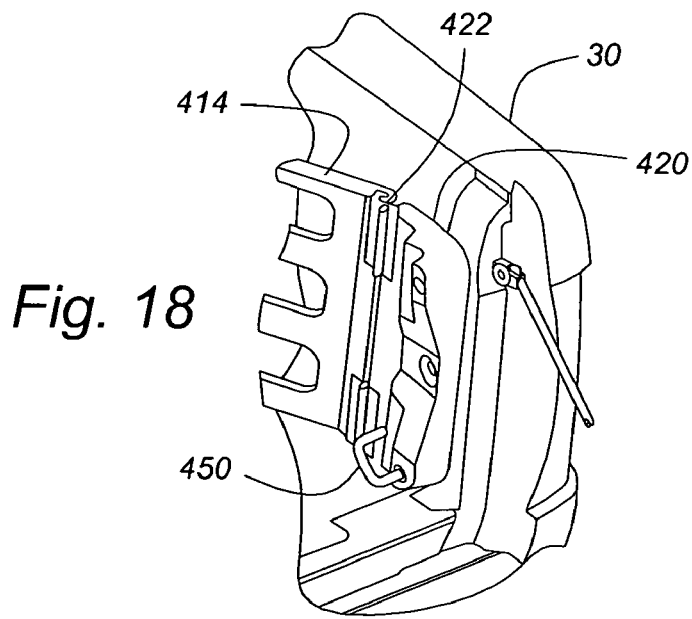
FIG. 18 is a perspective view of a hinge according to the third embodiment of the present invention.

FIGS. 17 and 18 illustrate a third embodiment of the present invention. In this embodiment, the right hand gate assembly 410 and the left hand gate assembly 412 have fewer gate sections and hinges in order to simplify the design. Also, a quick release hinge attachment may be employed.

The first right hand gate 414 may be longer than the second right hand gate 418 and pivotally mounts to the right rear quarter panel 30 of the box 26 via a hinge 422 and pivotable panel 420. A quick release hinge pin 450 may secure the pivotable panel 420 to the box 26. The quick release hinge pin 450 may be generally C-shaped in order to make it easier for one to grip and manipulate the pin. A right hand outer hinge 426 pivotally connects the first right hand gate 414 to the second right hand gate 418. A slide latch 430 may mount on top of the second right hand gate 418. While a slide latch 430 is shown for holding the two gate assemblies 410, 412 together, other types of suitable mechanisms may also be employed instead. For example, the gate assemblies 410, 412 may have quarter turn pins (not shown) that engage center overlapping sections.

The left hand gate assembly 412 includes a first left hand gate 432 that pivotally connects to a left hand pivotable panel 444 via a left hand hinge 446. The left hand pivotable panel 444 is secured to the left rear quarter panel 28 of the box 30 by a quick release pin 451, which may also be generally C-shaped as discussed above. A second left hand gate 436 pivotally mounts to the first left hand gate 432 via a second left hand hinge (not shown, but similar to the right hand side).

The right and left hand gate assemblies 410, 412 and the tailgate extender 22 of the supplemental tailgate, along with the tailgate 20, can be employed to perform the functions discussed above relative to the first embodiment. The deployment and stowage processes are similar, but with somewhat less flexibility in positioning the gate assemblies 410, 412 due to the reduced number of gates and hinges. In addition, with the modified pivotable panels 420, 444, hinges 422, 446, and quick release hinge pins 450, 451, the procedure for switching the gate assemblies 410, 412 from a box divider position to a box extender position is modified somewhat. In the stowed and box divider positions, the pivotable panels 420, 444 are oriented SO that the hinges 422, 446 are forward of the pivotable panels 420, 444, (as can be seen in FIG. 18). In this orientation, the free ends of the quick release pins 450, 451 may be employed to engage and hold the gate assemblies 410, 412 in their stowed positions when not in use, if so desired. In order to switch from the stowed or box divider position, one pulls the quick release hinge pins 450, 451, flips over the gate assemblies 410, 412, and then re-inserts the hinge pins 450, 451. The pivotable panels 420, 444 are now oriented so that the hinges 422, 446 are aft of the pivotable panels 420, 444, (as can be seen in FIG. 17).

While certain example embodiments of the present invention have been described in detail, those familiar with the art to which this invention relates will recognize various alternative designs and embodiments for practicing the invention as defined by the following claims.

What is claimed is:

1. A tailgate assembly for use with a motor vehicle having a first generally vertical side wall and a second generally vertical side wall, spaced from the first side wall, and a generally horizontal bed extending therebetween, the tailgate assembly comprising:
a tailgate frame defining a generally hollow cavity therein and adapted to pivotally mount generally between the first and second side walls and being operable in a generally horizontal open position and a generally vertical closed position; and
a supplemental tailgate assembly including:
a tailgate extender having a guide system secured generally within the hollow cavity; and a movable frame assembly having a telescoping support extendable from, pivotable relative to, and retained by the guide system, and a cross member connected to the telescoping support and extending generally normal thereto, said support being pivotable into an upwardly extending position and a downwardly extending position when the tailgate frame is in the horizontal open position; and
a first gate assembly including a first gate, adapted to pivotally couple to the first vertical side wall, and a second gate, pivotally coupled to the first gate, and with the first and second gates adapted to be pivotable to extend toward the movable frame assembly such that the second gate is positioned in engagement with said telescopic support to restrain rearward movement of said second gate off said tailgate frame when said support is pivoted into the upwardly extending position with the tailgate frame being in the horizontal open position.

2. The tailgate assembly of claim 1 wherein the supplemental tailgate assembly has a second gate assembly including a third gate, adapted to pivotally couple to the second vertical side wall, and a fourth gate, pivotally coupled to the third gate; and a latch device, mounted on at least one of the second gate and the fourth gate, and with the first gate assembly and the second gate assembly adapted to be pivotable such that the second gate and the fourth gate are securable together by the latch device.

3. The tailgate assembly of claim 2 wherein the guide system includes a pivot support and the telescoping support includes a pivoter that cooperates with the pivot support to allow the telescoping support to rotate upward to a generally vertical orientation when the telescoping support is substantially fully extended from the guide system and the tailgate is oriented in the generally horizontal open position, and the tailgate extender includes a securing assembly adapted to secure the movable frame assembly in the upwardly pivoted position.

4. The tailgate assembly of claim 3 wherein the securing assembly includes a lock rod assembly retained by and extendable from the cross member and having at least one lock rod latch adapted to be secured to at least one of the first and second side walls.

5. The tailgate assembly of claim 3 wherein, when the telescoping support is pivoted upward when the tailgate is in the generally horizontal open position, the second and fourth gates are securable together such that the cross member and telescoping support are adjacent to and support the second and fourth gates.

6. The tailgate assembly of claim 2 wherein the first gate assembly includes a fifth gate that is hingedly mounted between the first gate and the second gate, and the second gate assembly includes a sixth gate that is hingedly mounted between the third gate and the fourth gate.

7. The tailgate assembly of claim 1 wherein the first gate assembly includes a third gate that is hingedly mounted between the first gate and the second gate.

8. The tailgate assembly of claim 1 further including a step assist stop, and wherein the guide system includes a pivot support and the telescoping support includes a pivoter that cooperates with the pivot support to allow the telescoping support to rotate downward into engagement with the step assist stop when the telescoping support is substantially fully extended from the guide system and the tailgate is oriented in the generally horizontal open position.

9. The tailgate assembly of claim 8 wherein the first gate assembly includes a step assist handle mounted thereto.

10. The tailgate assembly of claim 8 wherein the cross member includes a flip step pivotally mounted on cross member.

11. The tailgate assembly of claim 1 wherein the movable frame assembly includes a latching assembly that selectively latches the movable frame portion in a retracted position in the guide system, and a latch release that operatively engages the latching assembly to selectively release the movable frame portion from the retracted position in the guide system.

12. The tailgate assembly of claim 1 wherein the first gate assembly includes hinge plate adapted to pivotally couple between the first gate and the first side wall, the hinge plate includes a tongue extending therefrom, and the first gate includes a groove slidably connected to the tongue.

13. The tailgate assembly of claim 1 wherein the tailgate frame includes a top portion, and the telescoping support is retractable within the guide system such that the cross member is substantially flush with the top portion.

14. The tailgate assembly of claim 1 wherein first gate assembly has a stowed position where the second gate is pivotable relative to the first gate so that the second gate extends substantially parallel to the first gate, and the first gate is adapted to be pivotable relative to the first side wall so that the first gate extends substantially parallel to the first side wall.

15. The tailgate assembly of claim 1 wherein the first gate assembly includes a third gate that is hingedly mounted between the first gate and the second gate, and the first gate assembly has a storage area position where the first gate and the second gate are adapted to extend generally normal to the first side wall, with the second gate having an edge that is adapted to be adjacent to the first side wall.

16. A tailgate assembly for use with a motor vehicle having a first generally vertical side wall and a second generally vertical side wall, spaced from the first side wall, and a generally horizontal bed extending therebetween, the tailgate assembly comprising:
a tailgate frame defining a generally hollow cavity therein and adapted to pivotally mount generally between the first and second side walls and being operable in a generally horizontal open position and generally vertical closed position;
a tailgate extender having a guide system secured generally within the hollow cavity, and a movable frame assembly having a support member extendable from, pivotable relative to, and retained by the guide system, and a cross member connected to the support member and extending generally normal thereto, the support member being pivotable into an upwardly extending position and a downwardly extending position when the tailgate frame is in the horizontal open position; and the guide system including a pivot support apparatus cooperable with pivot pins carried on the support member to permit pivotal movement of the support member relative to the guide system, said pivot pins being positioned at a distal end of the support member spaced from the cross member and extending outwardly from opposing sides of said support member, the pivot support apparatus including a pivot bracket mounted on opposing sides of the guide system so that the outwardly extending pivot pins can pivotally engage each respective pivot bracket.

17. The tailgate assembly of claim 16 wherein the tailgate frame includes a stop member engagable with the support member when the frame assembly is positioned in the downwardly extending position with the tailgate frame being in the horizontal open position.

18. The tailgate assembly of claim 16 further comprising a gate assembly mounted on at least one of the side walls and being configurable into an orientation that extends from the first and second side walls and on top of the tailgate frame when lowered into the horizontal open position, the frame assembly, when positioned in the upwardly extending position, being positioned adjacent the gate assembly to provide support thereto against rearward deflection of the gate assembly.

19. The tailgate assembly of claim 16 wherein the movable frame assembly further includes a retention tab mounted on the support member to be engagable with slots formed in the guide system for controlling the extension of the support member out of the guide system.

20. The tailgate assembly of claim 19 wherein the retention tab is biased toward engagement with the guide system slots by a spring.

21. A tailgate assembly for use with a motor vehicle having a first generally vertical side wall and a second generally vertical side wall, spaced from the first side wall, and a generally horizontal bed extending therebetween, the tailgate assembly comprising:

a tailgate frame defining a generally hollow cavity therein and adapted to pivotally mount generally between the first and second side walls and being operable in a generally horizontal open position and generally vertical closed position;

a tailgate extender having a guide system secured generally within the hollow cavity, and a movable frame assembly having a support member extendable from, and pivotable relative to the guide system, and a cross member connected to the support member and extending generally normal thereto; and a stop surface carried by the tailgate frame to abut the movable frame assembly when the movable frame assembly is deployed outward and pivoted downward relative to the tailgate frame.

22. The tailgate assembly of claim 21 wherein the guide system includes a pivot support apparatus cooperable with pivot pins carried on the support member at a distal end of the support member spaced from the cross member to permit pivotal movement of the support member relative to the guide system, the pivot pins are positioned, the pivot support apparatus defining a slot positioned on opposing sides of the guide system so that the pivot pins can engage the slots for pivotal support thereof.

23. The tailgate assembly of claim 21 wherein the movable frame assembly further includes a retention tab mounted on the support member to be engagable with openings formed in the guide system for controlling the extension of the support member out of the guide system, the retention tab being biased toward engagement with the guide system openings by a spring.

24. A tailgate assembly for use with a motor vehicle having a first generally vertical side wall and a second generally vertical side wall, spaced from the first side wall, and a generally horizontal bed extending therebetween, the tailgate assembly comprising:

a tailgate frame defining a generally hollow cavity therein and adapted to pivotally mount generally between the first and second side walls and being operable in a generally horizontal open position and generally vertical closed position;

a tailgate extender having a guide system secured generally within the hollow cavity, and a movable frame assembly having a support member extendable from, and pivotable relative to the guide system, and a cross member connected to the support member and extending generally normal thereto;

a stop surface carried by the tailgate frame to abut the movable frame assembly when the movable frame assembly is deployed outward and pivoted downward relative to the tailgate frame; and a gate assembly mounted on at least one of the side walls and being configurable into an orientation that extends from the first and second side walls and on top of the tailgate frame when lowered into the horizontal open position, the frame assembly when pivoted into an upwardly extending position being positioned adjacent the gate assembly to provide support thereto against rearward movement of the gate assembly.

* * * * *